United States Patent [19]

Gyori et al.

[11] 4,050,808

[45] Sept. 27, 1977

[54] ADDITIVE COLOR PRINTING METHOD AND APPARATUS

[75] Inventors: Robert Paul Gyori, Studio City; Thomas Tullio, Burbank, both of Calif.

[73] Assignee: De luxe General, Incorporated, Hollywood, Calif.

[21] Appl. No.: 703,735

[22] Filed: July 9, 1976

[51] Int. Cl.² .................. G03B 27/78; G03B 27/32
[52] U.S. Cl. .................................... 355/38; 355/77
[58] Field of Search .............. 355/35, 37, 38, 88, 355/77

[56] References Cited

U.S. PATENT DOCUMENTS

| 2,794,365 | 6/1957 | Baasner et al. | 355/35 |
| 3,199,402 | 8/1965 | Hunt et al. | 355/37 |
| 3,322,025 | 5/1967 | Dauser | 355/35 X |
| 3,359,424 | 12/1967 | Dreyfoos | 355/38 X |
| 3,492,070 | 1/1970 | Zahn | 355/37 |
| 3,647,296 | 3/1972 | Long | 355/38 |
| 3,672,768 | 6/1972 | Schaub et al. | 355/38 |
| 3,819,275 | 6/1974 | Aimi et al. | 355/38 X |
| 3,887,279 | 6/1975 | Rubin | 355/38 |
| 3,927,938 | 12/1975 | Seigenji | 355/38 |

*Primary Examiner*—Donald A. Griffin
*Attorney, Agent, or Firm*—Harry R. Lubcke

[57] ABSTRACT

Illumination for printing, including that reflected from a color negative, is sensed as to spectral content by a plurality of light-responsive sensors of mutually-exclusive spectral characteristics. That response is employed to control the spectral characteristic of the illumination for printing, as may be desired. The illumination for printing is homogeneously integrated as to intensity and spectral content prior to impinging upon the color negative by a hollow housing having both specularly and non-specularly reflective surfaces.

12 Claims, 2 Drawing Figures

ADDITIVE COLOR PRINTING METHOD AND APPARATUS

BACKGROUND OF THE INVENTION

This invention pertains to spectrally controlled illumination.

In color photography a pleasing and life-like end result is invariably desired. The exigencies of the original photographing, the imperfections of the photographic medium, and variations in photographic processing frequently result in a color negative that is less than perfect. Suitable variation of the spectral content of the printing illumination is a significant factor in improving the color positive made from a defective color negative.

While this has been known, and efforts have been made to mitigate imperfections in the negatives, unobvious imperfections in printer performance have remained.

The prior art has proposed, of course, employing essential printer elements, as a plurality of spectrally distinct sources of illumination emitting red, green and blue light, a diffusing surface, the negative, and positive paper, with suitable optics.

Spectrally distinct photocells have also been proposed to obtain a measure of the total spectrum of the printing illumination by connecting these photocells in pairs and to a null-indicating meter for manual color correction of the illumination. However, a necessary teaching as to the input of illumination to the photocells and its relation to the printing illumination has been absent.

A similar proposal has been made in which exposure intervals for each individual primary color are terminated mechano-optically according to data from color analysis of the negative through the intermediary of a computer.

Two further similar proposals have been made to use a cathode-ray tube for flying-spot illumination of the color negative to obtain colormetric data on the negative. A computer interprets this to prevent "subject failure" and to otherwise obtain a positive print of the best possible color fidelity by the subtractive process of color photography.

A lamphouse for premixing colored light from filtered lamp sources has been proposed that employs an inwardly recessed roof, with the individual source light being introduced thereto through rod screens. Means to sample the integrated light were not provided.

Another lamphouse substitutionally provided for a black and white enlarger employs 6 lamps, each having a color filter and shining upon a house-roof shaped mixing chamber, which chamber has only diffusely reflecting white walls. Color balance is manually obtained by rheostats.

Another colored light mixing structure employs relatively long and narrow individual light tunnels that are lined throughout with specularly reflecting surfaces; i.e., mirrors.

SUMMARY OF THE INVENTION

It has been previously overlooked that the light reflected back into an integrating chamber used for the controlled mixing of color components to produce a desired chroma is reintegrated and thus alters the color composition of the light originally there. If the negative sought to be printed contained only black and white the alteration would not occur. However, nearly all color negatives have different color values inherent to the subject photographed. Thus, colormetric values obtained by an analysis of the negative alone will be incorrect.

A polychromatic feedback to means for controlling the intensities of the individual primary light sources must sense the actual integrated and reintegrated light as a whole and the means must accomplish adjustment of the light sources accordingly.

This invention propounds that method and provides apparatus for its accomplishment.

To do this a high-performance compound type of light integrating chamber is employed; one that has specularly reflective surfaces adjacent to the negative, and non-specularly reflective surfaces adjacent to plural color component light sources.

Sensors continuously individually spectrally sense the illumination, including both the integrated and reintegrated contributions. Control information is thus provided for the adjustment of each primary color light source, and this is used to control the electrical energy that energizes each light source.

DESCRIPTION OF THE PREFERRED EMBODIMENT

Figure 1:
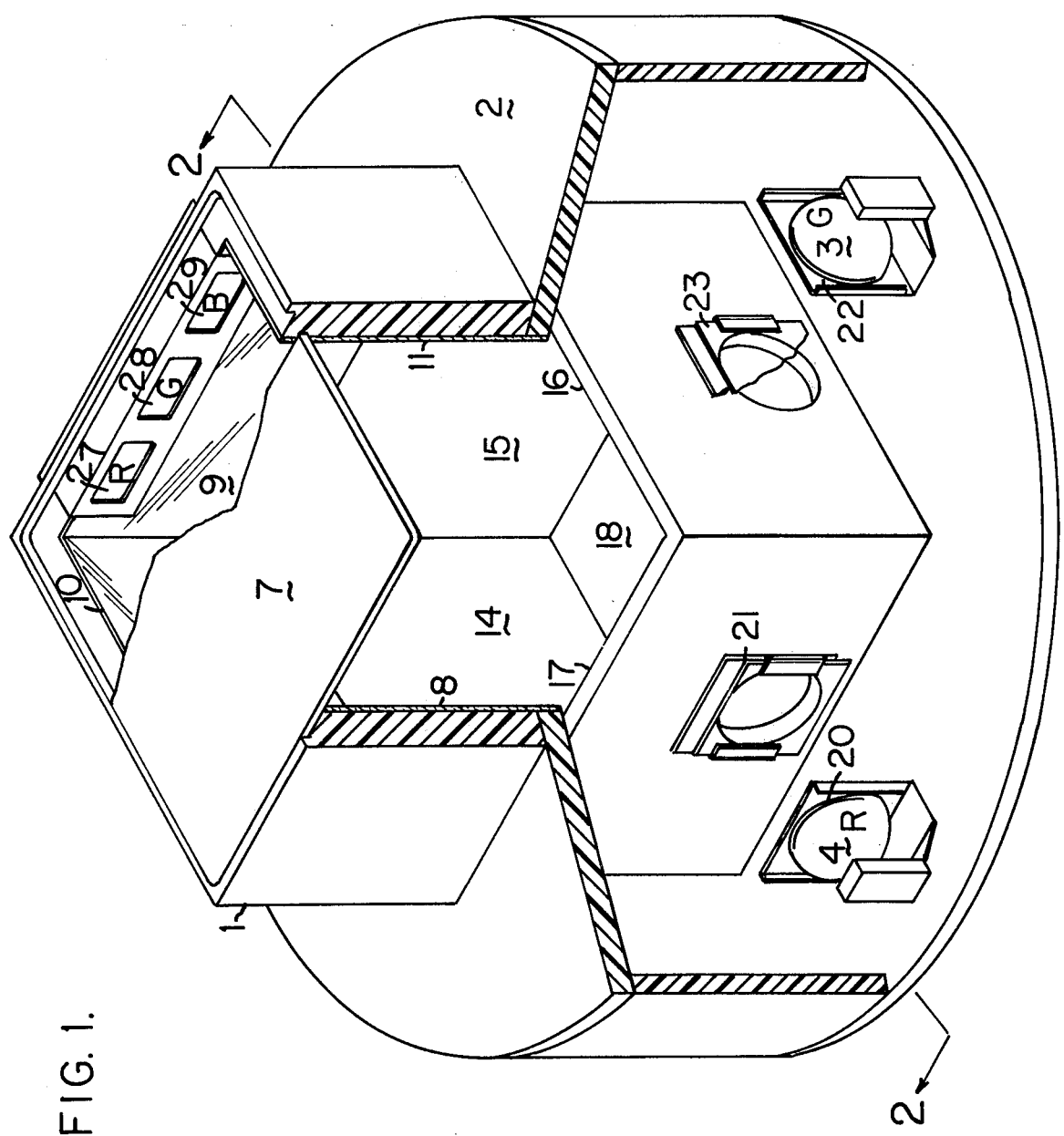
FIG. 1 is a perspective view of the apparatus, broken away in various places to reveal the internal structure.

In the figures, numeral 1 indicates a hollow housing. This is an optical light-integrating structure. It is typically a rectilinear parallelopiped of approximately cubical shape. It is shown having a greater vertical extent than that of a cube. This dimension may be altered to suit the remainder of the printer structure (not shown) with which it is used while still accomplishing the light-integrating function required.

An outer housing 2 surrounds essentially the bottom half of housing 1. Outer housing 2 provides a structure for mounting the illuminating lamps 3, 4, 5, 6, but does not enter into the optical aspects of the light-emissive apparatus. The outer housing may be cylindrical, or any other shape that will accommodate the lamps.

The inner surface of hollow housing 1 has optical significance but the other aspects of both housings 1 and 2 do not. Thus, the material for these housings may be any dimensionally stable and heat resistant metal, plastic or wood.

The upper surface 7 of hollow housing 1 is translucent. That is it may be an opal or frosted glass or an equivalent plastic. A suitable degree of translucency is such as to be the equivalent of one f/ stop. A suitable thickness for the material is 2.7 millimeters.

The four inner sides of the upper approximately half of hollow housing 1 are faced with specularly reflective surfaces; i.e., mirrors 8, 9, 10, 11. These need not be first-surface mirrors. The usual silver-glass mirror is satisfactory, as is a metal mirror of equivalent reflectivity. In general, these mirrors are mounted upon the upper interior surface and this may or may not result in the mirrors being at a very slight angle, rather than parallelism for opposing mirrors.

The four inner sides 14, 15, 16, 17, and bottom 18 of the hollow housing are provided with a non-specularly reflecting surface; (sides 16 and 17 are not directly seen in FIG. 1 and side 17 is not seen in FIG. 2 because of the nature of these illustrations).

Essentially, this requires that these surfaces shall not be wholly planar, nor smooth. A suitable surface is provided by first stipple-painting the inner surfaces of the housing 1 with white paint. A finely wrinkled surface obtained by baking a wrinkle-type paint is also suitable.

The resulting surface is then given a magnesium flash. This is accomplished by burning pure metallic magnesium in air with hollow housing 1 inverted over it. The magnesium oxide smoke that is formed coats the interior surface.

The final result is a randomly irregular surface of relatively high reflectivity over a wide spectral range.

A certain optically-equivalent paint by Kodak may be a substitute.

It might be thought that the recited ratio of areas, the placement of the areas, and the specular characteristic thereof could be a matter of choice.

Unobviously, this is not so.

Some thirty hollow housing configurations were evolved, and only the configuration just described provided fully satisfactory performance.

Considering the extremes, when the hollow housing was covered all over the interior with specular (mirror) surfaces the integration of the light was poor. With four primary color light sources preferably employed to supply the red (two lamps), green, and blue light, four areas of not fully integrated light appeared at the exit aperture, translucent surface 7.

When the hollow housing was covered all over the interior with the non-specular reflective surface previously described the intensity of the light was insufficient at the exit aperture.

With the herein disclosed preferred configuration a very fine degree of uniformity of the intensity of illumination, such as less than 0.02% variation is achieved over the whole translucent surface 7; with the uniformity of integrated color corresponding.

Each light source is comprised of a lamp, as 4, and associated filters 20, 21. Typically, in order to obtain a desired illumination level of red light, two such sources are provided, disposed on opposite sides of the cubical housing, as identified by lamps 4 and 5. Filter 20 is a heat-absorbing glass that is used to lower the temperature on the succeeding color filter. Filter 21 provides desired spectral response for the red source. It preferably has peak transmissibility at 700 nanometers (nm) and reaches zero transmissibility at 600 nm. It may be of the dichroic type since the light from the lamp is essentially collimated. The long wavelength limit of the filter is immaterial, since the typical printing paper is not sensitive in the far infra-red region.

Each of the four lamps may be a type G. E. EKE95, quartz-iodine, of 150 watts rating. Conventional incandescent lamps may also be used and the wattage may be varied to a considerable degree depending upon the level of printing illumination required.

The green source is exemplified by lamp 3 and filters 22 and 23. Filter 22 is a heat-absorbing glass close to the lamp. Filter 23 peaks at 540 nm and has an average width of 80 nm. It may also be dichroic.

Similarly, the blue source is exemplified by lamp 6 and filters 24 and 25. Filter 24 is a heat-absorbing glass. Filter 25 peaks at 440 nm, has an average width of 60 nm, and may be dichroic.

If these filters are of the high temperature type, utilizing heat-treated glass, a blower for providing air at a nominal velocity for cooling them is in order. If these filters are of the ordinary type, a vacuum system of cooling gives high velocity cooling the filters without causing various eddies and air streams within hollow housing 1.

Blower or vacuum cooling means have not been shown in the figures, since such devices are known.

Suffice it to say that the blower preferably has discharge nozzles at each filter.

Cooling by vacuum may be accomplished with one dust-filtered inlet upon an outer surface of outer housing 2 and an exhaust outlet similarly located on the opposite side of that housing.

Light sensors 27, 28, 29 contribute to the method of this invention and are a significant part of the structure. A preferred location is as shown in the figures; aligned at the upper edge of one side of hollow housing 1. The location selected must be such as to allow the sensors to accept the fully integrated light, such as that that impinges upon translucent surface 7. The location must not be such as to allow the sensors to accept only the light coming from the sources of light; i.e., in this embodiment sources 3, 4, 5, 6.

Figure 2:
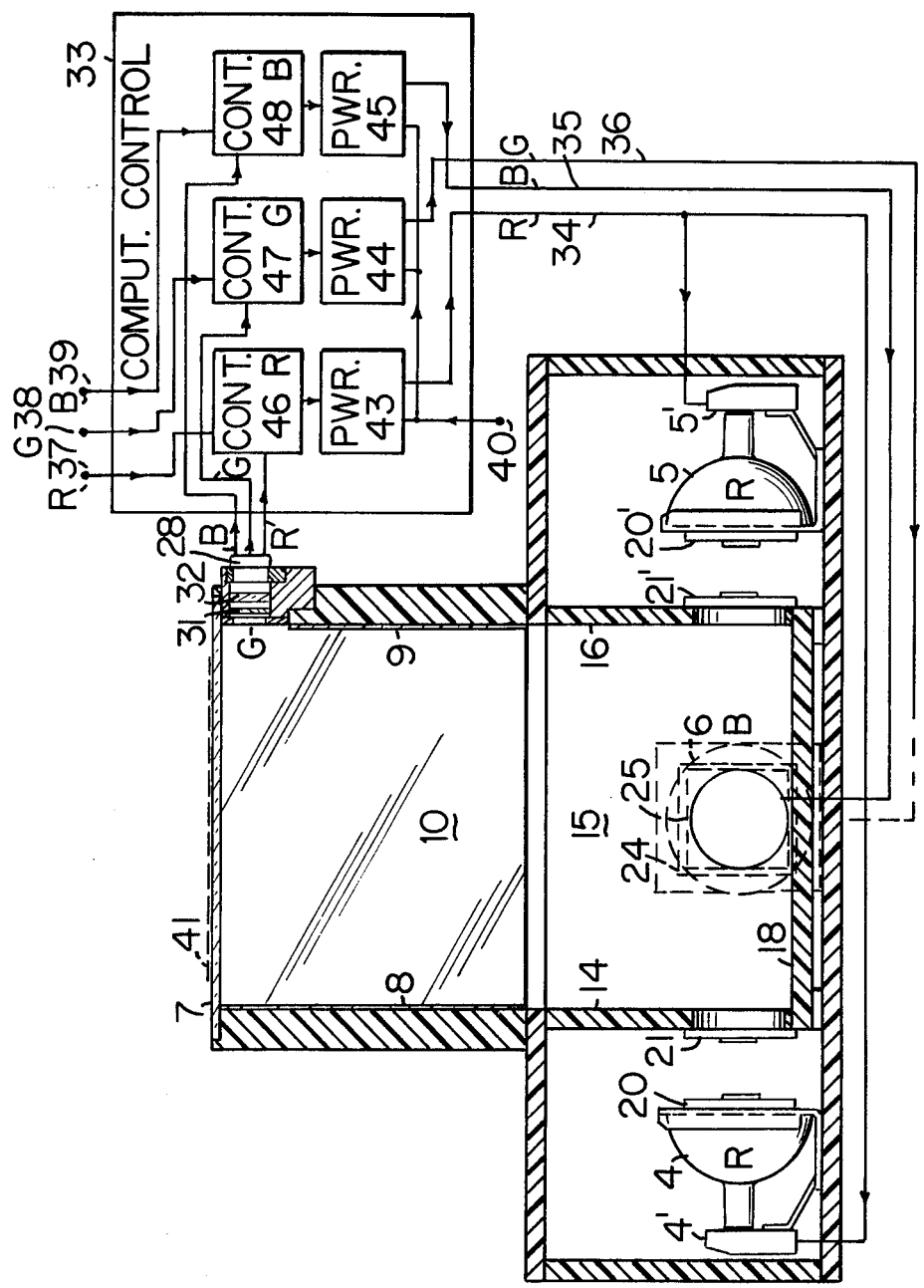
FIG. 2 is a sectional elevation taken along the centerline 2—2 of the same.

In FIG. 2 green sensor 28 is shown in section. The sensor per se may be any light-responsive device having a substantially linear response, a sufficient amplitude of response to be significantly above the noise level, and a stability of response with respect to temperature, lifetime and usual ambient conditions. Such a sensor is a solid-state light-sensitive diode that is temperature-stabilized, and has an operational amplifier built-in. The amplifier significantly lowers the impedance of the output and retains a low noise level. The device is the United Photodetector 450 and is commercially obtainable from the United Corporation of Santa Monica, Calif.

It is preferable that the spectral acceptance band of the three sensors not be overlapping, and each may have a relatively narrow pass bandwidth.

In the sensor 28 assembly filter 31 is an infra-red dyed glass filter suited to prevent essentially all such radiation from reaching the sensor proper. If the sensor is a silicon device, the sensitivity to infra-red radiation is high and the desired green light response could be seriously inaccurate.

Filter 32 is typically a glass green color dye filter. Since the illumination within the hollow integrating housing 1 is highly diffuse as to the direction of arrival upon the sensors a dichroic type filter is unsuitable. Filter 32 peaks at 540 nm and has an average width of 60 nm.

Sensor 27 assembly similarly has an infra-red filter and behind that a glass red color dye filter that peaks at 700 nm and has an average width of 125 nm.

Sensor 29 assembly also similarly has an infra-red filter and behind that a glass blue color dye filter that peaks at 410 nm and has an average width of 120 nm.

The electrical output from each of the sensors becomes an input to computer control 33. This is an interface device and it utilizes the response of each of the sensors in a single channel for each sensor, along with desired colormetric information that is inserted for each channel from a manual means of entry or from a computer, to determine the amplitude of electrical energy to be applied to each illuminating lamp.

This energy is conveyed from the computer control via conductor 34 to the two red-filtered lamps 4 and 5 through known sockets 4' and 5'. Similarly, energy is conveyed to blue lamp 6 via conductor 35, and to green lamp 3 (not seen in FIG. 2) via conductor 36.

A prime source of power, such as known alternating current power, is connected to terminal 40, and enters the computer control. Therein it is controlled according to the inputs previously mentioned, and the preselected power level is passed on to each lamp.

It will be recognized that there is a completed feedback loop for each primary color according to this invention. This is from a lamp, illumination, sensor, computer control, and back to energizing the lamp. The level of illumination for each loop is determined by the setting of the inserted information to computer control 33. It is maintained at that setting regardless of optically significant factors that would otherwise alter it.

As an example, assume that a negative 41 is placed upon the upper surface of translucent surface 7 for making a print, and that the negative has an excess of blue, such as an outdoor photograph that includes large areas of blue sky and blue water.

In the prior art the resulting integrated light would contain too much blue illumination because a significant blue reflection from the negative would re-enter hollow housing 1 and would be re-integrated. However, with the present invention, blue sensor 29 responds to the greater blue component in the integrated light to be utilized to print from the negative at hand and the computer control decreases the energy input to blue-filtered lamp 6. The desired predetermined intensity of blue light utilized to print from the negative is thus retained.

The manner of entering the predetermined values of primary color components is schematically shown in FIG. 2 by an input 37 for the red component, input 38 for the green component, and input 39 for the blue component. Each input is converted to an analog electrical value and is used to control the power circuit energizing the particular illumination lamps.

It will be appreciated that with the sensor control of this invention the insertion of new lamps 3, 4, 5, 6, or any of them, will not require any recalibration. The sensor feedback circuits adjusts the energy input to the new lamp(s) automatically to take care of the known spectal difference between an old lamp and a new lamp.

Also, although light filters are availble according to this invention that have desirably sharp peaks and minimal spurious cross-chromatic response, all realizable filters have some such response. As an example, if there is a red to green cross-chromatic response ("spillover") and the red entered input at 37 in FIG. 2 is purposely increased by the operator, there would be a residual increase in the green light in integrating housing 1 unless corrective measures were taken. However, with sensors 27, 28, 29 and computer control 33 acting according to this invention, the input electrical energy to green lamp 3, via conductor 36, is automatically correspondingly reduced.

Similarly, even with spurious illumination the predetermined three color values are retained. As a test, a flashlight was shone into hollow housing 1. Regardless of the fact that the spectral composition of the light from the flashlight was not known, but would have altered at least two of the primary colors involved, the power adjustment to the two lamps affected took place automatically and the predetermined three color values were maintained.

Computer control means 33 is preferably comprised of controllable plural separate electric power sources 43, 44, 45, and plural separate control circuits 46, 47, 48. The former are each connected to terminal 40 and separately to the plural light sources. The latter are individually connected to the plural light-responsive means and to the recited separate electric power sources for the control thereof. The control circuits also accept the predetermined values of primary color components 37, 38, 39.

We claim:
1. The method of additive color printing which includes the steps of;
   a. illuminating the color negative to be printed with integrated light of a preselected spectral character that is adjustable,
   b. separately accepting plural portions of said light according to mutually-exclusive spectral characteristics with the particular said color negative to be printed in place, and including light reflected only therefrom,
   c. reintegrating the combined light, and
   d. automatically adjusting the spectral characteristic of the light illuminating said color negative according to each said mutually-exclusive spectral portion to retain the preselected color printing spectral characteristic.
2. Light-emissive apparatus, comprising:
   a. a hollow housing (1) having a translucent transparency-receiving surface (7) and plural light sources (3, 4, 5, 6) of different spectral characteristics spaced from said surface,
   b. a specularly reflective surface (8, 9, 10, 11) within said housing adjacent to said translucent surface,
   c. a non-specularly reflective surface (14, 15, 16, 17, 18) within said housing adjacent to said light sources,
   d. plural light-responsive means (27, 28, 29) positioned adjacent to said translucent transparency-receiving surface, and
   e. control means (33) connected to said plural light-responsive means and to said plural light source for the respective individual control of the output of said plural light sources of different spectral characteristics.
3. The apparatus of claim 2, in which:
   a. the extent of said non-specularly reflective surface in the direction away from said translucent surface is substantially equal to the extent of said specularly reflective surface, successively, also in the direction away from said translucent surface.
4. The apparatus of claim 2, in which:
   a. said hollow housing has an approximately cubical shape, and
   b. said transparency-receiving surface comprises approximately the sixth side of the cube.
5. The apparatus of claim 2, in which;
   a. said light sources are four in number, and
   b. one light source is disposed on each one of the four sides of the cube, relatively far away from said transparency-receiving surface.
6. The apparatus of claim 5, in which;
   a. each said light source is comprised of,
      1. an electric lamp, and
      2. a color filter (21, 23, 21', 25) spaced from said lamp along the optical path of the light source into said hollow housing.
7. The apparatus of claim 6, in which;

a. each said electric lamp is an incandescent lamp.

8. The apparatus of claim 2, in which;
 a. said plural light-responsive means (27, 28, 29) are three in number, and
 b. said plural light-responsive means are disposed upon one side of said hollow housing.

9. The apparatus of claim 8 in which each of said plural light-responsive means is composed of:
 a. a color filter (32) of unique spectral characteristic adjacent to the side of said hollow housing, and
 b. a solid-state light-responsive element behind said color filter.

10. The apparatus of claim 2, in which;
 a. said non-specularly reflective surface is a magnesium flash over a stipple surface paint.

11. The apparatus of claim 2, which additionally includes;
 a. an outer housing (2) having means (3', 4', 5', 6') for mounting said plural light sources (3, 4, 5, 6).

12. The apparatus of claim 2, in which said control means (33) is comprised of;
 a. plural separate electric power sources (43, 44, 45) individually connected to said plural light sources, and
 b. plural separate control circuits (46, 47, 48) individually connected to said plural light-responsive means and to said plural electric power sources.

* * * * *